United States Patent
Zeng

(10) Patent No.: US 11,510,106 B2
(45) Date of Patent: Nov. 22, 2022

(54) TWO-LEVEL GRID-BASED ANOMALY AREA IDENTIFICATION AND SOLUTION NOMINATION FOR RADIO ACCESS NETWORKS

(71) Applicant: VMware, Inc., Palo Alto, CA (US)

(72) Inventor: Helen Zeng, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 120 days.

(21) Appl. No.: 17/155,250

(22) Filed: Jan. 22, 2021

(65) Prior Publication Data

US 2022/0240123 A1 Jul. 28, 2022

(51) Int. Cl.
*H04W 24/02* (2009.01)
*H04W 28/08* (2009.01)
*H04W 28/02* (2009.01)
*H04W 52/24* (2009.01)
*H04W 16/28* (2009.01)

(52) U.S. Cl.
CPC ....... *H04W 28/0983* (2020.05); *H04W 16/28* (2013.01); *H04W 24/02* (2013.01); *H04W 28/0268* (2013.01); *H04W 52/241* (2013.01)

(58) Field of Classification Search
CPC ..... H04W 24/00; H04W 24/02; H04W 24/04; H04W 16/14; H04W 16/28; H04W 24/08; H04W 28/0268; H04W 28/0289; H04W 28/08; H04W 28/0983; H04W 36/30; H04W 52/241
See application file for complete search history.

(56) References Cited

U.S. PATENT DOCUMENTS

| | | | | |
|---|---|---|---|---|
| 2007/0243881 | A1* | 10/2007 | Roskowski | H04W 24/00 455/456.1 |
| 2014/0094178 | A1* | 4/2014 | Eskicioglu | G01S 5/0252 455/440 |
| 2016/0037480 | A1* | 2/2016 | Bellamkonda | H04W 4/029 455/456.2 |
| 2020/0187213 | A1* | 6/2020 | Yun | H04B 17/345 |
| 2021/0243623 | A1* | 8/2021 | Bodiga | H04W 24/08 |

* cited by examiner

*Primary Examiner* — Quoc Thai N Vu
(74) *Attorney, Agent, or Firm* — Clayton, McKay & Bailey, PC

(57) ABSTRACT

A system can include a network analysis platform for a two-level grid-based anomaly area identification and solution nomination in a radio access network. The network analysis platform can map key performance indicators for user sessions in the network to a grid that overlays a geographic area. The grid can be based on a military grid reference system. A machine-learning model can take a vector of key performance indicator samples as input and identify a problem for the grid. The network analysis platform can nominate cells to attempt to remediate based on ranking poor performing bins in the grid and determining the cells that contribute most to the problem in each bin. For a nominated cell, the network analysis platform can perform remediation actions to solve a coverage problem, throughput problem, or both. The problem can be solved for the grid while preventing conflicts between individual cells.

20 Claims, 6 Drawing Sheets

TWO-LEVEL GRID-BASED ANOMALY AREA IDENTIFICATION AND SOLUTION NOMINATION FOR RADIO ACCESS NETWORKS

BACKGROUND

Radio access networks ("RANs"), such as LTE or 5G networks, require constant monitoring to detect problems with performance and capacity. For example, poor signal strength, poor signal quality, or high traffic demand all can adversely impact user experience.

Normally, problems are identified in a radio access network on a cell basis. For example, an administrator can identify a problem and then attempt to draw a polygon around the problem spots. A troubleshooter can check a serving cell in the problem spot, then adjust parameters of that cell as needed. Parameters can also be adjusted for neighboring cells to attempt to load balance user sessions across the cells. Antennae tilt can also be adjusted for the cells as an attempt to change interference between nearby cells and improve signal strength and quality. Such an approach can also be used to redesign the polygon for the problem area, although the resulting effect is often uncertain.

These existing techniques have several shortcomings. First, the work can be very manual, relying heavily on human trial and error and on the map format for polygon visualization. Second, most existing techniques lack an overall picture of the problem. For example, a coverage problem may result in a recommendation to uptilt an antenna of a cell without acknowledging that the cell is already more overloaded than a neighboring cell. In such a case it may be better to make the neighboring cell the serving cell for the problem location. Similarly, throughput may be increased on a first cell even though a second neighboring cell is under-utilized. Third, as the network dynamically changes parameters, conflicts can occur. Parameters can dynamically change back and forth between cells without ever truly satisfying the issue, instead shifting the issue back-and-forth between cells.

SUMMARY

Example implementations of technology described herein include systems and methods for area-based anomaly identification and solution nomination in a radio access network. The area-based technique can use two-level grids, with the first level further divided into smaller grids or "bins" on a second level. Unlike prior methods, the method can allow for area-based problem identification prior to attempting to fix individual cells while resolving some conflicts between cells when adjusting cell parameters. In one example, a network analysis platform can execute on a physical hardware server as part of a RAN architecture. The network analysis platform can identify problems for an entire area and recommend remedial actions.

In one example, the network analysis platform can map key performance indicator ("KPI") samples from user sessions to individual bins of a grid. The grid can be part of a larger matrix that is applied to a geographic region, dividing the region into bins. For example, each grid can be a ten-by-ten collection of bins, although grid granularity can be set by administrator in an example. The grid can be produced as part of a military grid reference system, which can include a matrix mapped to the planet's geography. The grid can be a first level of that system, with the bins being a nested second level within the grid. The grid and bins within the matrix can adhere to a numbering system that allows for easy identification of adjacent grids and bins. For example, with a grid reference system, additional digits can be added to reference bins within a grid, and the grids themselves can be referenced within the matrix with the same numbering system. To zoom in and out on the levels (e.g., grid, bin, sub-bin), different numbers of digits can be used on the reference numbers. In this way, each bin can be a grid within the main grid. The KPI samples can be organized with respect to these bins over a time period, such as one hour. This time period can dictate the frequency with which the network analysis platform attempts to identify a problem in the grid.

To identify a problem, the network analysis platform can provide values based on the mapped KPI samples as inputs to a machine learning model. This can include considering the worst KPI samples of the bins (i.e., on the second level), such as the bottom 5%, and taking an average or some other summarization of those samples. The first-level grid itself can be provided as an input, such as by providing vectors of values per bin as inputs to the machine learning model. The machine learning model can be pretrained based on historical data for the region of the grid, and can output an indication that a problem with coverage or throughput exists for the grid.

When a problem exists, the network analysis platform can also determine offender bins within the grid. The offender bins can include KPI samples indicative of poor performance relative to other bins. In an example, the worst bins are identified based on ranking the bins according to the mapped KPI samples. For example, each bin within the grid can be assigned a weight based on ranking, with the bin having the worst performance KPI samples being accorded the highest weight. A certain number of bins with the highest weights can be identified as offender bins. Although "highest" weights is used for convenience, the weights can instead be lowest in another example that distinguishes poor performance with lower weights.

For each identified offender bin, the network analysis platform can determine which serving cells in that bin have the highest percent of samples and which serving cells have the most percent of samples of those with the worst KPIs. For example, the worst KPIs can be the 5% lowest for each bin, in an example. The network analysis platform can then rank the cells and nominate a certain number of worst-ranked cells within the whole grid for remediation.

The network analysis platform can then apply a remedial action to one or more of the nominated serving cells. This can include looping through all the nominated serving cells and for each cell determining what remedial actions to take. The remedial actions can be selected by a machine learning model or can be based on KPI values in conjunction with the type of problem (e.g., coverage or throughput) detected for the overall grid. Suggested remedial actions can be displayed to an administrator on a console graphical user interface, in an example. Alternatively, the network analysis platform can automate the fixes by sending commands to the nominated cells or neighboring cells. The commands can be sent over a network and implement application programming interfaces for the nominated cells.

Since a set of cells are nominated to fix the problem for the whole grid, the solution can be provided in a coordinated way, which helps resolve some conflicts that otherwise occur when changing parameters of individual cells in isolation. The network analysis platform can consider the remedial actions for all of the nominated cells together, such that a change to one cell does not further exacerbate an issue for another nominated cell. In addition, multiple grids (i.e., on the first level) can be analyzed and remedial solutions for adjacent grids can account for conflicts. For example, if the same target cell exists for both grids, the network analysis platform can ensure that the remedial actions for that target cell are consistent. Likewise, target cells of a first grid can be considered when they are neighboring cells of target cells in a second grid.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Figure 1:
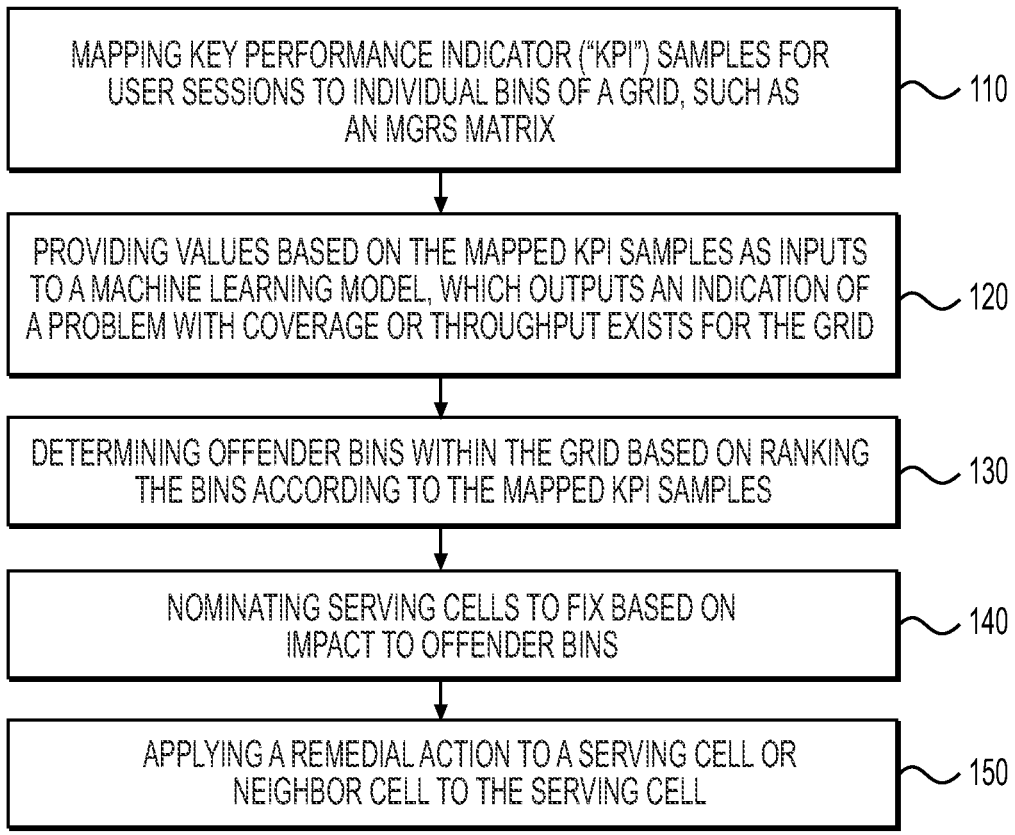
FIG. 1 is a flowchart of an example method for grid-based anomaly area identification and solution nomination in a radio access network.

Reference will now be made in detail to the present examples, including examples illustrated in the accompanying drawings. Wherever possible, the same reference numbers will be used throughout the drawings to refer to the same or like parts.

A system for two-level grid-based anomaly detection can identify a problem in a radio access network ("RAN") based on examining information across a grid. A network analysis platform can apply a grid to a geographic region. For example, the military grid reference system ("MGRS") can be used for the grid, allowing for customized second-level bin granularity within the first-level grid. The grid can be a first level within the MGRS matrix, with the MGRS bins being a second level nested within the MGRS grid. Additional sub-bins can be nested at still lower levels within each bin, allowing for zooming in and out from a granularity perspective, in an example. Information samples describing user sessions can be collected with respect to the bins in the grid (e.g., second-level MGRS bins for a first-level MGRS grid). Other grid systems besides MGRS are also possible.

User sessions can be serviced by one of multiple serving cells that transmit into the area represented by the grid. The network analysis platform can summarize the samples within the bins of the grid over a time period, such as an hour. For example, an average of the worst five percent of samples in each bin can be calculated. By supplying summaries of the samples in the grid format (such in a matrix) to a machine learning ("ML") model, the model can output whether the grid currently has a coverage problem, throughput problem, both, or neither.

When a problem exists, the network analysis platform can use the grid to determine which cells to adjust in a remediation attempt to fix the problem. For example, the bins can be ranked based on the average of the worst 5% of KPIs. Identified offender bins having the worst performance rankings (i.e., highest or lowest, depending on the example) can then be used to identify cells for potential remediation. For each offender bin, cells that contribute the most to the poor KPIs of that bin can be identified. The identified cells from each offender bin can then be ranked across the grid, with the worst ranked cells be nominated for remediation. After that, the nominated cells can be divided into different remediation cases that can dictate whether the network analysis platform adjusts a cell's tilt, transmission power, or load balancing parameters.

Addressing RAN issues in this way with a two-level grid-based approach can provide more holistic diagnoses than traditional approaches. Instead of focusing on a single cell, the entire area can be taken into account and different cells can be nominated for adjustment using the grid-divided samples from the user sessions. With the advent and rollout of 5G technology, grid-based analysis can take advantage of the huge amount of data expected with internet of things ("IoT") and 5G devices. Analyzing the entire grid at once will allow for more accurate problem recognition and remediation.

FIG. 1 is a flowchart of an example method for example method for two level grid-based anomaly area identification and solution nomination in a RAN. At stage 110, the network analysis platform can map KPI samples of user sessions to individual bins of a grid. The bins can be on a second level of the grid. The grid can be applied to a geographic region and can be rectangular in nature. In one example, the network analytics platform includes a console, allowing an administrative user to set the boundaries of the grid in relation to a geographical map. This can include dragging the grid or setting longitude and latitude values for the grid. Additionally, the administrator can adjust the granularity of the bins. For example, the grid can be a 1 kilometer ("km") square whereas the individual bins can be 100 meter ("m") squares within the grid. The grid itself can be selected for analysis but can exist within an even larger grid. For example, the grid being analyzed can be a square kilometer, with 100 m bins, but the square kilometer can be nested within a 100 square kilometer grid area. The grid for analysis can be selected by an administrator on based on granularity settings of the network analysis system, in an example. A system such as MGRS can include numbering that naturally allows for such nesting based on the level of zoom that the administrator desires. As explained herein, the bins at the second level can be used to determine problems in the grid at the first level.

In one example, the network analysis platform can utilize MGRS for the grid and bins. MGRS can include a numbering system for latitude and longitude that allows for adjusting bin granularity by adding digits to the numbers. For example, a four-digit MGRS ID can indicate a 1000 m bin, whereas a six-digit MGRS ID can indicate a 100 m square. MGRS is also used as a geocode for planet earth and can be mapped to a geographic region using the geocode. The use of MGRS or a similar grid system can allow for easily selecting granularity of bins within grids, and granularity of analysis grids within an overall larger grid.

The network analysis platform can collect metrics from user sessions and map them to the bins of the grid being analyzed. The metrics can be KPI samples that indicate a location, a serving cell identifier, and information about the session performance. For example, the KPI samples can indicate reference signal received power ("RSRP"), reference signal received quality ("RSRQ"), signal to noise ratio ("SINR"), throughput, traffic volume, interference levels, and other performance-related information.

Based on the location information for the KPI sample, each sample can be assigned to a bin of the grid. In one example, this can be done by converting coordinates, e.g., global positioning satellite ("GPS") coordinates, to an MGRS ID. In another example, the KPI sample can include an MGRS ID.

For analysis purposes, the KPI samples can be organized relative to the bins during a time interval. For example, the collection frequency can be per hour. However, the time interval is also configurable using the console of the network analysis platform, in an example. For example, the collection frequency can be set to 15 minutes or some other time interval.

At stage 120, to determine if a problem exists in the grid, the network analysis platform can provide values based on the mapped KPI samples as inputs to an ML model. In one example, a summary of KPI samples for each bin can be used, with each bin organized as a vector for analysis. The whole grid can be a matrix with each bin as one value (or vector of values) in the matric. This two-level grid can be used as an input to the ML model. For example, a matrix of values representing the grid can be an input to the ML model.

Each bin can include a vector with a summary of the KPI samples. For example, the vector for each bin can be in the form of [RSRP, throughput, day, hour]. The RSRP for a bin can be the average of the worst 5% RSRP samples in that day and hour. Similarly, the throughput for a bin can be the average of the worst 5% throughput samples in that day and hour. RSRP can be used to determine coverage problems and throughput can be used to determine throughput problems. Other KPIs not included in the vector, such as SINR, can still be utilized later during problem cell nomination.

The ML model can use the matrix of vectors or other values to output an indication of whether a problem with coverage or throughput exists for the grid. The output can represent a problem with coverage, throughput, both, or neither. The output can apply to the entire grid, such that the ML model recognizes whether the corresponding area has the problem. Unlike a prior system where an administrator must start with a serving cell that they believe is problematic, the ML model can identify an entire area as having a problem prior to attempting to remediate any particular cell that serves the area. When analyzing a market, country, or state, there can be many grids. Each can be applied to the ML model to analyze, for example, 1 km at a time, in an example.

To determine whether the grid has a problem, the ML model can consider which bins have a problem and how severe the problem is for those bins. Additionally, the ML model can analyze whether the problems last for multiple time periods (e.g., multiple hours) and whether the bins are connected or scattered. With an MGRS grid, the labelling convention can identify neighboring bins. For example, for 100 m bins, ID numbers 954926 and 954927 are neighboring cells. For 1 km bins, 9692 is contiguous with and on the east side of 9692. The scattered or grouped nature of the problematic bins can be used to determine if the grid has a problem.

The ML model can be trained based on historical user session performance metrics. The historical performance metrics can include 720 hours of data for all user sessions in the grid, in an example. Any ML training algorithm can be used, such as a recurrent neural network ("RNN") or convolutional neural network ("CNN") algorithm. The recommended ML model can thoroughly study the behavior of the two-level grid to determine problems, unlike a traditional approach of using a simple threshold to determine whether anomalies exist.

Stages 130, 140, and 150 relate to nominating which cells to address as part of fixing the problem identified by the ML model. The remedial actions can be achieved based on nominating an individual cell and, for that cell, changing the antenna tilt, transmission power, and load balancing parameters, such as inter- and intra-frequency handover ("HO") related parameter thresholds.

The network analysis platform can make these changes based on a periodic basis, such as on an hourly basis, based on the time period selected in the console. The changes themselves are intended to be macro-level changes that address the entire grid, such as at the entire 1 km MGRS level. Additional micro changes to the individual nominated cells are intended to help effectuate the macro-level changes. This can reduce shortcomings of existing technological approaches, such as resolving some conflicts that micro changes often have. For example, (e.g., changing a first cell's parameters can adversely impact a neighboring cell, leading to changes to the neighboring cell that negatively impact the first cell, and so on). Micro changes can be applied more often than the analyzed time period for a grid, in an example. Micro changes performed by each individual cell are not impacted, in some examples. Instead, the network analysis platform can set an overall remediation strategy for each grid, such as how the load of cells serving that grid can be balanced. The network analysis platform need not run on real-time basis, in an example.

At stage 130, when the problem is indicated, the network analysis platform can determine offender bins within the grid based on ranking the bins of the matrix according to KPI samples related to coverage or throughput. A worst ranked set of bins can be the offender bins. Each bin can be a vector of KPIs, and the KPIs for each bin can be the average of the worst 5% KPI samples. However, other summaries besides the average of the worst 5% can also be used. The bins can be ranked based on the KPIs, with the worst ranked being identified for further analysis. In one example, the worst ranked bins are given the highest ranking and are identified as the offender bins.

In one example, the bins can be ranked based on each bin's average of the worst five percent of KPIs during the time period, referred to here as an R value. The bins can be ranked based on R with the lowest R as highest ranking. In that example, the bins with the lowest R can be considered as potential offender bins. To determine the offender bins, a maximum number of offender bins, such as five, can be applied. Therefore, the worst ranked bins can be selected as the offender bins. Since there can be multiple analyzed KPIs, i.e., RSRP and throughput, the ranking can be done for each of the KPIs. This can result in one ranking of RSRP for coverage a problem and another ranking of throughput for throughput problem. Other factors can cause the network analysis platform to reduce the identified offender bins. For example, if a bin's R value for RSRP is greater than −95 dBm, this can indicate good performance. As a result, if the bin's R value is in that range, then it can be excluded from the list of offender bins, in an example. Additionally, if fewer than five bins fail to meet the R criteria, then a smaller number of offender bins can be selected.

At stage 140, network analysis platform can nominate serving cells to attempt to fix. For example, for each offender bin determined in stage 130, the network analysis platform can determine cells that contribute to the bin's offender status, such as by ranking the cells of the respective offender bin. In one example, the cells can be ranked based on how many KPI samples are attributed to user sessions served by the respective cell. In one example, the ranking is based on weights. Weights can be generated based on a cell's percentage of total samples in the bin and a percentage of worst samples from each serving cell.

In one example, a total cell weight W can be determined based on the bin ranking, the percentage of samples for the cell, and the percentage of the worst 5% samples for the cell in current bin. The three factors can be combined together to give the weight of each cell. In one example, less than all three factors can be used to determine cell weights.

The serving cells can then be nominated based on rank across the entire grid. If the same cell is nominated for multiple different bins, then the highest weight W for that cell can be used as the cell's final weight. From the cell lists L across all the offender bins, cell weights W can be ranked in descending order. A threshold number, such as top five, of worst cells can be chosen as the nominated serving cells. In other words, the nominated serving cells can be the final cells selected to solve the problem for the grid.

The nominated serving cells can then be targeted for remedial actions. Adjusting these cells can potentially fix the problem(s) identified in stage 120 for the entire grid.

Stages 130 and 140 can also operate by using different KPI values than RSRP in other examples. For example, while RSRP is relevant for coverage, the stages can use downlink throughput KPI samples for the user sessions when attempting to fix a throughput problem. When the ML model of stage 120 indicates both a coverage and throughput problem exists, both RSRP and downlink throughput KPIs can be considered, separately or individually, and other KPI types are also possible for analysis.

In one example, two different nominated cell lists can be created for separate throughput and coverage problems. The nomination process can be largely the same, with different types of KPI samples being considered. These nominated cells can be the target of remedial actions.

At stage 150, the network analysis platform can apply a remedial action to a nominated serving cell. This can include notifying an administrative user, such as through email or a visualized alert on the GUI. Alternatively, the network analysis platform can automatically attempt to apply the remedial action, such as by making application programming interface ("API") calls to interfaces for the nominated serving cells.

The remedial action can include changing one or more of antenna tilt, transmission power, and load balancing parameters such as inter- and intra-frequency HO related parameter thresholds. These changes can cause improvements to downlink interference, load balance of individual cells, and coverage characteristics of the cell.

The remedial action can be based on a root cause analysis. The root cause analysis of the network analysis platform can consider whether cells are suffering from reduced throughput or coverage (i.e., lost signal), then analyze whether these problems manifest in the form of uplink interference, downlink interference, load imbalance, coverage, or device issues. The recommended remedial action can then be one or more of changing tilt, uplink power, downlink power, load balancing parameters, or software fixes.

In one example, for each nominated cell, the network analytics platform can choose between four different remedial cases to apply. The cases are discussed in more detail below in connection with FIGS. 3A and 3B.

Figure 2:
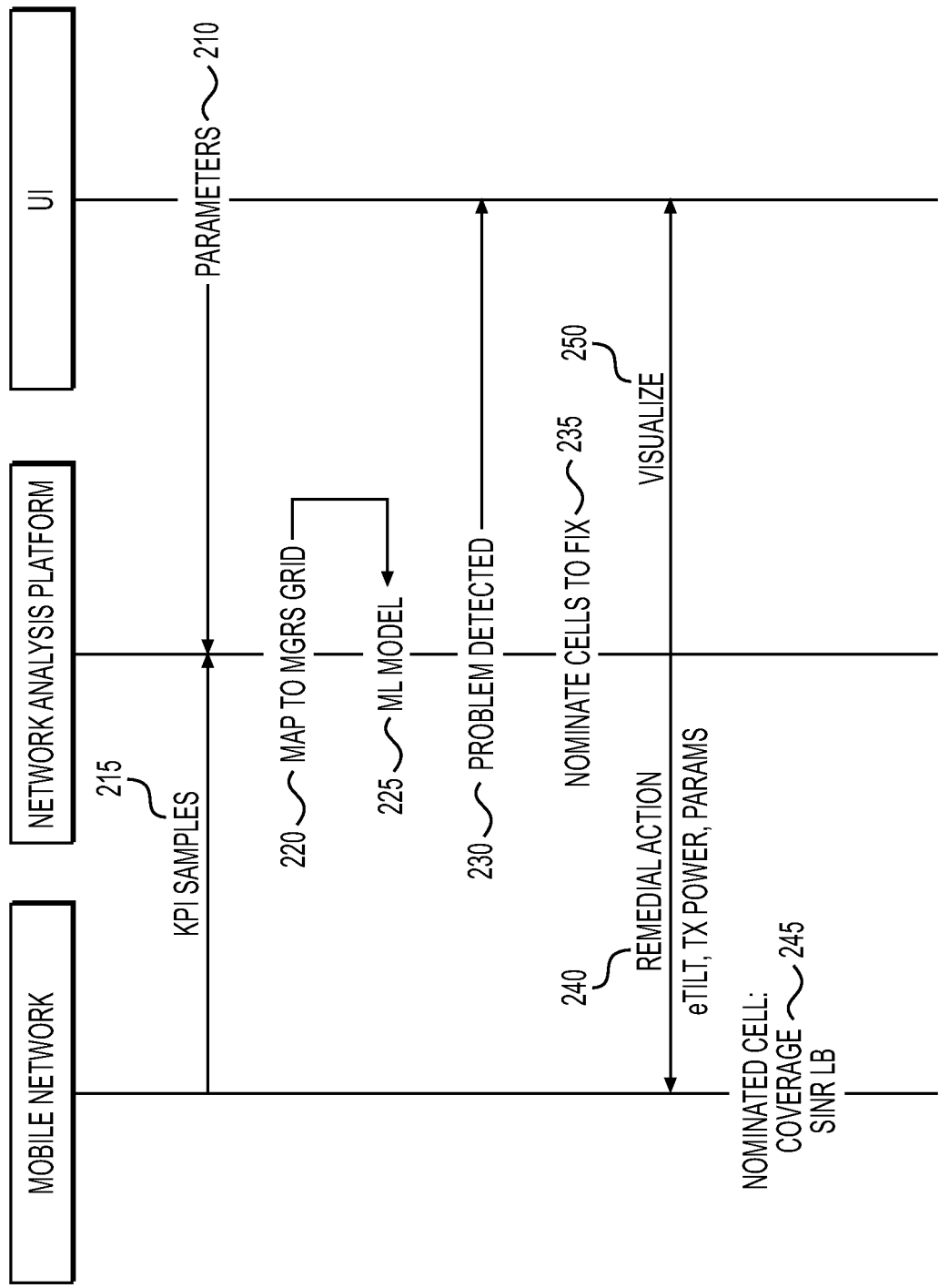
FIG. 2 is a sequence diagram of an example method for grid-based anomaly area identification and solution nomination in a radio access network.

FIG. 2 is a sequence diagram of an example method for a two-level grid-based anomaly area identification and solution nomination in a radio access network. At stage 210, an administrator can use a console GUI of the network analysis platform to set parameters that guide operation of the problem detection. The GUI can be generated by a webserver and set variables used by the network analysis platform. The updated parameters can be sent to the network analysis platform for local storage.

For example, the GUI can include a first option to adjust the time period for the KPI samples. The time period can dictate the frequency with which the grid is used with the ML model to identify a problem. The time period can be, for example, hourly, fifteen minutes, or daily.

As another example, the GUI can include a second option to adjust a size granularity of bins in the grid. When the grid is an MGRS matrix, the GUI can allow the user to specify the boundaries of the matrix and the size of the bins, for example. For example, the bins can adjust in size by changing the number of digits used in the MGRS ID for each bin. The granularity can be manipulated to fit the training capabilities for ML models, with more granular being more specific in problem diagnosis but potentially requiring more samples to train. Additionally, the grid itself can be selected and sized on the GUI in an example. The grid selected for analysis can be part of a larger overall matrix. For example, a one square km grid can be selected within the matrix, in an example. Alternatively, the matrix can be automatically divided into grids of a selected size, such that multiple grids are independently analyzed as part of the network analysis.

In yet another example, the console GUI can include a third option for configuring which KPI samples to use in the analysis. This can include selecting which types of KPIs to map to the grid and which bottom percentiles to analyze with the ML model or when ranking the bins and cells. Several different selections can be presented for selecting these different criteria.

In another example, the parameters set at stage 210 can be updated automatically. For example, if a problem persists after remedial fixes are applied, different KPI types can be analyzed or a different grid granularity can be selected.

At stage 215, KPI samples can be received at the network analysis platform from various cells within the mobile network. Stage 215 can be ongoing in an example, with KPI samples being received at periodic intervals or constantly queued from reporting cells. The telemetry data can be captured and measured in real time by base stations, which send the telemetry data to the network analysis platform. The network analysis platform itself can perform analysis in non-real-time based on the collected KPI samples, which can be arranged according to time interval.

At stage 220, the network analysis platform can map the KPI samples to the MGRS grid. This can include assigning the samples to the bins of the grid. This can be done based on location information for each sample or for a user whose session is associated with the samples. In one example, the KPI samples themselves are created to include coordinates. This can even include creating KPI samples that include MGRS coordinates for minimizing processing required by the network analysis platform.

Some subset of the KPI samples can be used as inputs to the ML model at stage 225. For example, a bottom five percent of samples (or other selected threshold) of particular KPI types can be averaged and converted into a vector for the bin. For example, sample averages for a particular hour can be assigned to each bin and the grid of vectors can be provided as an input to the ML model 225. The ML model 225 can be pretrained to detect problems within the grid based on the KPI types and grid size.

At stage 230, the ML model can identify a problem with one or both of coverage and throughput for the grid. The problem can be indicated as an alert on the GUI console for the network analysis platform, in an example. This can begin a process of root cause analysis for purposes of performing a remedial action, in an example.

At stage 235, root cause analysis can include nominating which cells to fix. This can include ranking offender bins and ranking cell contributions to the bins' relatively poor rankings (as offenders). For example, the techniques described with respect to stages 130 and 140 of FIG. 1 can be applied here.

The nominated cells and suggested remedial actions can then be visualized on the console GUI at stage 250, in an example. This can allow an administrator to oversee and approve the remedial actions, in an example. Alternatively, the remedial actions can be automatically implemented without human approval. Different nominated cells can have different suggested remedial actions. Additionally, the remedial actions can include changing settings on neighboring cells that may be causing interference to a serving cell.

At stage 240, the remedial actions can be applied. The remedial action can include changing one or more of antenna tilt, transmission power, and load balancing parameters such as inter- and intra-frequency HO related parameter thresholds. These changes can cause improvements to downlink interference, load balance of individual cells, and coverage characteristics of the cell at stage 245.

The remedial action chosen for a particular cell can be based on whether that cell is suffering from reduced throughput or coverage (i.e., lost signal). From there, the network analysis platform can determine whether the problems manifest in the form of uplink interference, downlink interference, load imbalance, coverage, or other device issues. The recommended remedial action can then be one or more of changing tilt, uplink power, downlink power, load balancing parameters, or software fixes.

In one example, for each nominated cell, the network analytics platform can choose between four different remedial cases to apply. The cases are discussed in more detail below in connection with FIGS. 3A and 3B.

Figure 3A:
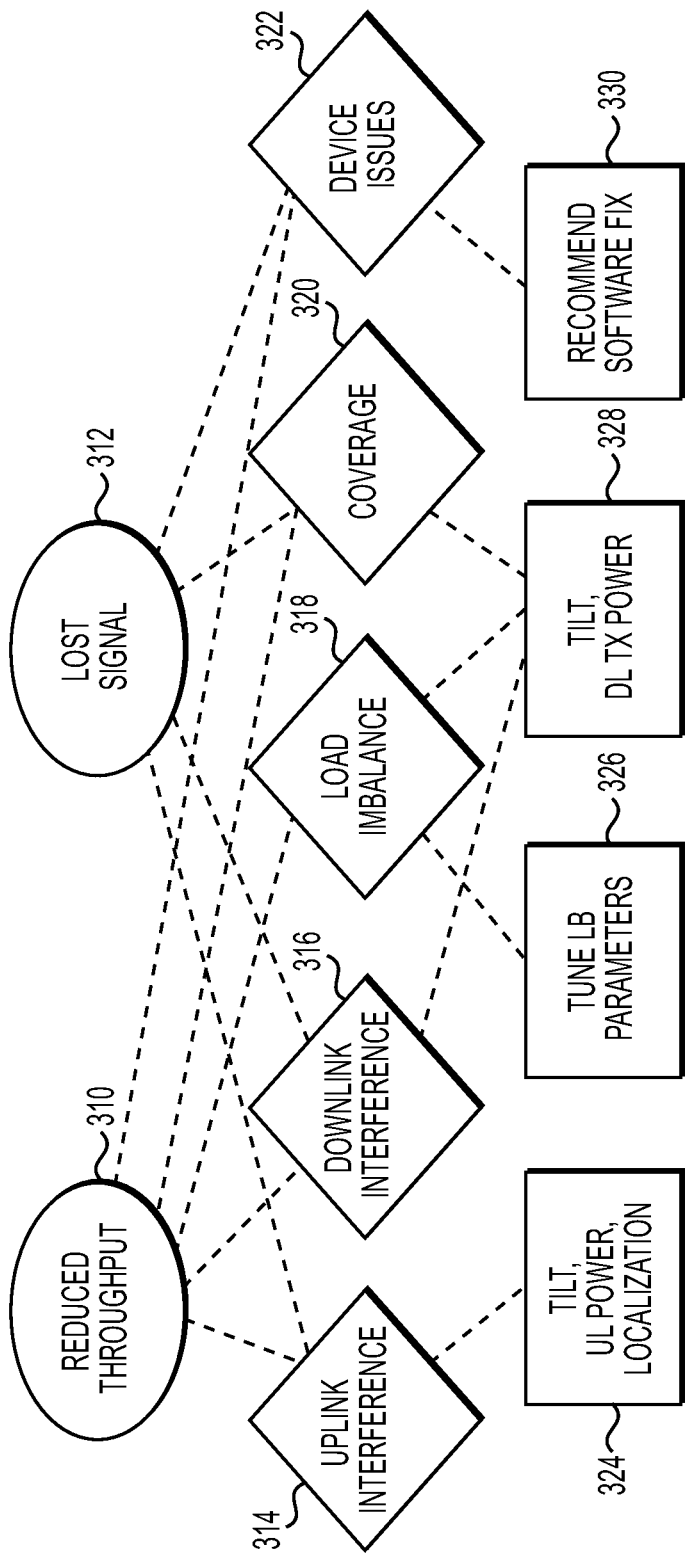
FIG. 3A is a flowchart of an example method for performing actions for nominated cells in a radio access network.

FIG. 3A is an example flow chart with stages for performing a remedial action when the network analysis platform detects a problem with throughput or coverage within the grid. The network analysis platform can first determine whether the problem is reduced throughput at stage 310, a coverage issue at stage 312, neither, or both. The determination can be made based on the ML model output, in an example.

The dashed lines lead from the problems at stages 310 and 312 to potential root causes 314, 316, 318, 320, 322. Based on the KPI samples attributed to the nominated cells, one or more of these root causes 314, 316, 318, 320, 322 can be identified. In one example, the network analysis platform can rely on an additional neural network ML model to identify the root cause. The root cause can also be identified by the ML model that identifies the problem for the grid. For example, the ML model can output one or more root causes along with the problem identified based on the using the grid vectors as an input.

From there, four different remediation cases 324, 326, 328, 330 are possible. The dashed lines from the root causes 314, 316, 318, 320, 322 to the remediation approaches 324, 326, 328, 330 show which root causes 314, 316, 318, 320, 322 can be linked to which remediation approaches 324, 326, 328, 330.

The first remediation approach 324 includes changing the cell's antenna tilt or transmission power to improve coverage. A second remediation approach 328 can include changing the cell's antenna tilt or transmission power to improve SINR. In one example, load balancing includes changing load balancing parameters at the cell and potentially a neighboring cell to change how user sessions are load balanced between cells. A third approach 326 is to change load balancing parameters, such as parameters that dictate when to pass a user session to another cell. The fourth remediation approach 330 can include recommending a software fix or additional sites.

In one example, the tilt can be restricted to at least two degrees to prevent overshooting. If uptilt to less than two degrees does not fix the problem by itself, the network analysis platform can attempt to also adjust transmission power. Because any change will impact a neighboring cell in some way, the neighboring cell also be considered.

Figure 3B:
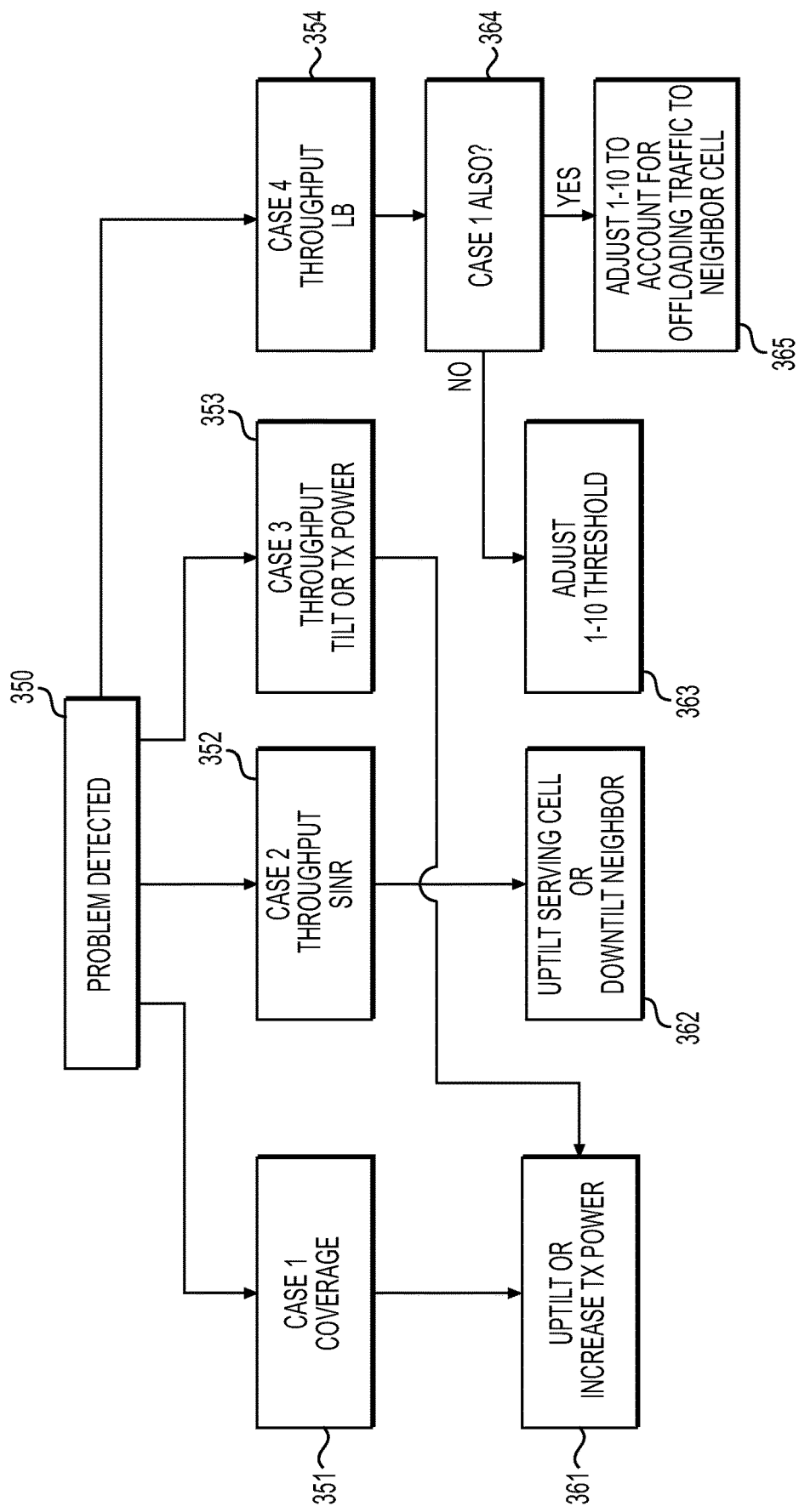
FIG. 3B is a flowchart of an example method for performing actions for nominated cells in a radio access network.

The remediation approaches 324, 326, 328, 330 are discussed in more detail with respect to FIG. 3B. FIG. 3B is an example flow chart with stages for performing a remedial action when the network analysis platform detects a problem with throughput or coverage within the grid.

At stage 350, a problem is detected by the ML model. The problem can be one or both of throughput and coverage. The root cause can also be determined using a neural network ML model in an example. In general, different KPI shortfalls can indicate the different root causes 314, 316, 318, 320, 322 of FIG. 3A.

The first remedial case 351 can apply to a coverage problem. To fix the coverage, at stage 361 the network analysis platform can change either the tilt or increase transmission power. In one example, changing the tilt is preferred. A physical download control channel ("PDCCH") utilization threshold PT can be defined, such as at 70%. If the PDCCH utilization of the nominated cell is greater than the threshold, the network analysis platform can prevent adding additional traffic to that nominated cell. However, if PDCCH utilization is less than PT and the cell tilt is greater than two degrees, the cell can be uptilted by one degree. (Tilt can be counted from a horizontal level, where zero tilt is flat.) If the transmission power is less than maximum, the transmission power can be incremented. If transmission power is already maximized or none of the above conditions apply, the console GUI can display an alert suggesting that new sites be recommended.

In addition, the network analysis platform can get the nominated cell ID along with the top few, such as three, intra-frequency neighbor cell IDs. The intra-frequency neighbor cells can be those with strongest intra-frequency neighbor among all possible neighbors. In one example, the strongest three neighbor cells are identified. Then, the network analysis platform can adjust the tilt (such as with the etilt parameter) of one or more of these neighbor cells. For example, when the uptilt or transmission power is increased on a serving cell, the network analysis platform can apply down tilt on a neighboring cell.

The second remedial case 352 can apply to a throughput problem, such as when SINR values are low. At stage 362, the network analysis platform can down tilt one of the strongest ranked neighbor cells and uptilt the nominated serving cell. If the neighbor cell has already reached a maximum down tilt (e.g., etilt minus two), then the network analysis platform can refrain from further down tilting of that cell and try to down tilt another of the ranked neighbor cells.

To determine which of the ranked neighbor cells to down tilt, the network analysis platform can start with the highest ranked and see if the neighbor cell is also a different nominated serving cell. If so, the network analysis platform can skip that neighbor cell and traverse to the next ranked neighbor cell, performing the same check before down tilting. In this way, the network analysis platform can prevent a conflict, such as weakening a neighbor cell that itself is already nominated for fixing.

The third remedial case 353 can also apply to a throughput problem, when the ML model or other process at the network analysis platform determines load balancing or transmission power adjustment is needed. In general, the third remedial case 353 can be the opposite of the second case 352. In the third case 353, the network analysis platform can determine that a nominated serving cell needs to offload traffic to a neighbor cell.

Therefore, at stage 361 the network analysis platform can address the third case 353 by performing the etilt adjustment in the opposite direction as in stage 362, applying uptilt to neighboring cells that are not also other nominated serving cells. If the uptilt changes are not possible, then the network analysis platform can attempt to increase transmission power of that neighbor cell. If neither are possible, the console GUI can suggest adding additional sites to offload the serving cell.

The fourth remedial case 354 can also apply to a throughput problem but can be based on a problem with load balancing parameters. Each site can have multiple sectors, and each sector has multiple cells which are also called overlays, including a low band capacity layer, a mid-to-high band capacity layer. At stage 365, the network analysis platform can attempt to shift traffic from the low band to the mid-to-high band within the same sector. But if utilization in the higher band is already high, then the network analysis platform can attempt intra-frequency load balancing to hand off traffic to an intra-frequency neighbor.

If the nominated serving cell is low band, then the network analysis platform can determine the PDCCH utilization difference between the serving cell and a mid-to-high band neighbor. If the difference is greater than a threshold, such as 20%, then the network analysis platform can adjust an inter-frequency hand off parameter, such as by 1 dB. This can cause more sessions to switch over into available higher band service, reducing the load on the nominated serving cell. As with the other remedial actions 361, 362, the HO parameters can be adjusted on neighbor cells that are not also in the list of nominated serving cells. If adjustments are not available based on the nominated cell list or the HO parameters already being maximized or minimized, the network analysis platform can suggest adding new sites on the console GUI.

In one example, the network analysis platform can also check for conflicts when multiple different root causes are detected. For example, if the first case 351 and second case 352 exist simultaneously, no conflict exists and the remedial actions 361 and 362 can both be carried out. If the first case 351 and third case 353 exist simultaneously, then the changes associated with the third case 353 take precedent at remedial action 361. The network analysis platform can check again in the next time period, such as one hour, to see if the changes eliminated the problem. If not, then additional changes for the first case 351 can be applied.

When the first case 351 and fourth case 354 exist simultaneously, a conflict can exist. The network analysis platform can check for this conflict at stage 364. The reason for the conflict is that increasing coverage will also increase the load. Therefore, the serving cell will need to off load even more traffic to a neighboring cell. In this case, the HO parameter needs to be adjusted in value at stage 363. For example, the HO offset needs to adjust such that more traffic can shift to neighbor cell than in stage 365. This can offset the otherwise conflicting changes at stage 361.

The method be applied on all grids in the network. For example, multiple grids can span an MGRS matrix. However, because the same nominated cell can serve areas in multiple grids, it is possible for conflicts to arise between remedial actions in different grids. If conflicts exist for remediating nominated cells of the multiple grids, the conflicts can be handled similarly to conflicts between adjacent bins (in some examples, bins can be sub-grids with their own sub-bins). For example, when changes are made on a 1 km MGRS grid basis and a conflict exists with changes in an adjacent MGRS grid, conflict resolution rules can be implemented by the network analysis platform. As an example rule, if more than one grid (e.g., 1 km MGRS) requires changing the same parameter of the same nominated cell and the changes are in the same direction, no conflict exists. For example, the network analysis platform can suggest a one-degree tilt increase for both grids or a 1 dB change in HO threshold value for both. In either case, the same target cell can be adjusted to remediate the problem in both grids.

However, if more than one grid requires opposing changes to the same target cell, then the network analysis platform can decline to make any changes to the target cell. In other words, if the network analysis platform suggests increasing a parameter for a first grid, but decreasing the parameter of the same nominated cell for a second grid, the network analysis platform can recognize this conflict and make no change to the parameter. For example, analysis of a first grid can suggest increasing etilt on a first cell by one degree, while analysis of a second grid suggest decreasing the etilt of the first cell. The network analysis platform can make a final decision to not increase or decrease the etilt of the first cell.

Figure 4:
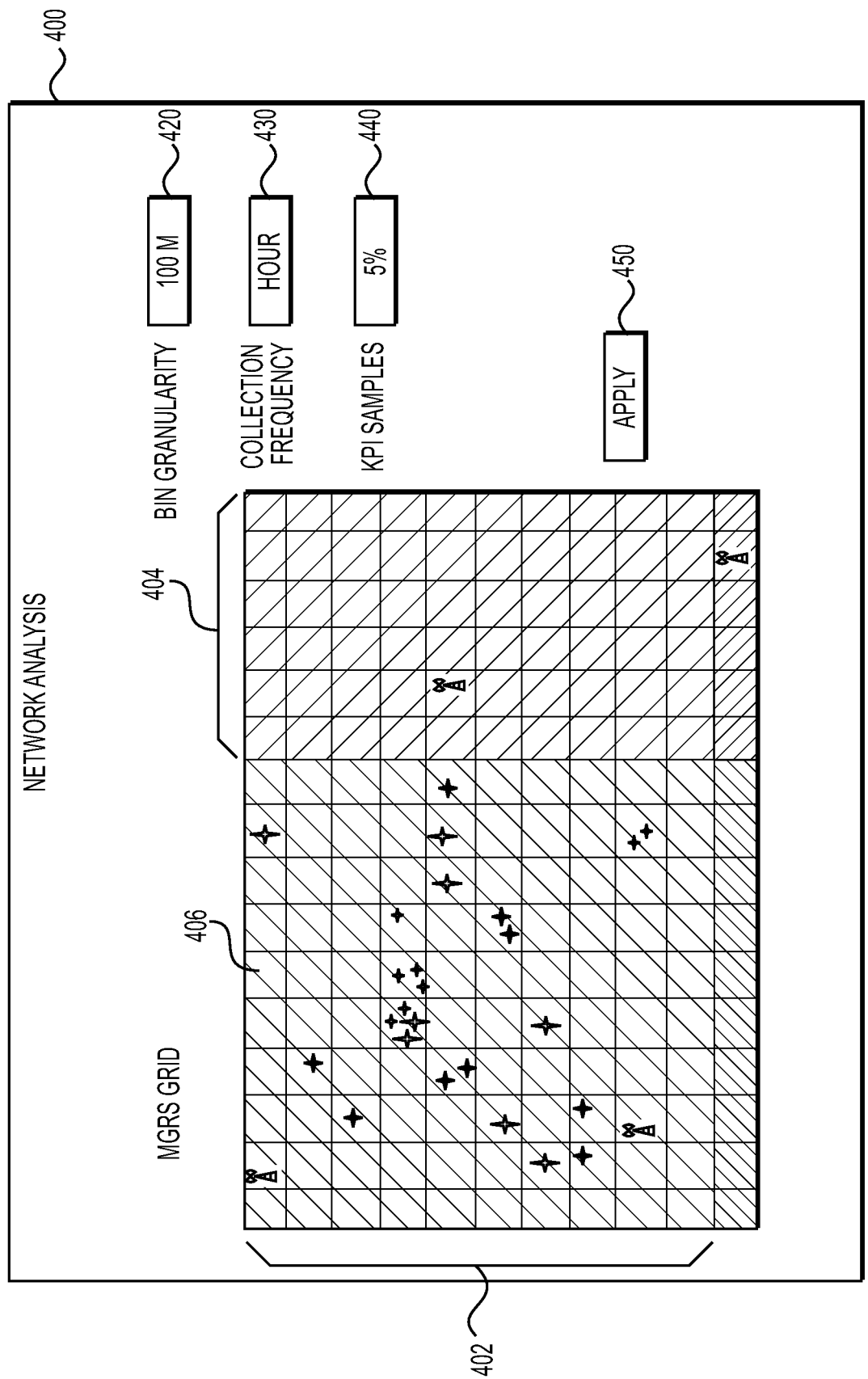
FIG. 4 is an illustration of an example GUI screen for setting parameters used in grid-based anomaly area identification and solution nomination in a radio access network.

FIG. 4 is an illustration of an example GUI screen 400 for setting parameters used in two-level grid-based anomaly area identification and solution nomination in a radio access network. The GUI screen 400 can be part of a console provided to an administrator of the network analysis platform.

In one example, the GUI screen 400 can include visualization of the grid, such as MGRS grid 402. In this example, the MGRS grid 402 for analysis is a 10 by 10 collection of bins with each bin 406 representing a square area within the grid 402. The grid 402 itself is shaded differently than additional regions 404 of the larger MGRS matrix. This can allow for analysis of a particular region by the network analysis platform. In one example, the grid 402 for analysis can be selected or defined by the administrative user simply moving the grid 402 or its boundaries on a geographic map. In another example, the geographic map is split into multiple grids 402 that are separately analyzed. For example, region 404 can be part of a second MGRS grid that is analyzed in addition to grid 402. The network analysis platform can recommend dividing grids of the existing MGRS matrix based on past offender bins, such that grid 402 is centered on the offenders in an attempt to reduce conflicts between grids. As shown in the example, the stars inside grid 402 can represent KPIs leading to offender bins in the grid 402. The tower icons can represent the location of cells relative to the MGRS matrix and grid 402.

In one example, the GUI screen 400 can include an option 420 for changing bin granularity. This can cause the grid 402 to be comprised of more or fewer bins. The grid 402 can also be sized smaller or larger, in an example. With an MGRS grid, available granularity can be based on the MGRS ID system, which allows for increasing granularity by adding digits to the bin IDs.

The GUI screen 400 can also include an option 430 for setting analysis frequency. In this example, the time period is set to hourly. However, the analysis can be in 15-minute intervals, day intervals, or other custom intervals. This setting can dictate the time period over which KPI samples are analyzed. Another option 440 can be used to set a threshold for which percentage of worst KPI samples are considered per bin. This setting can impact the averages provided in vector form to the ML model as part of detecting a problem in the grid 402.

When the administrative user has selected the desired parameters or grid granularity, the apply button 450 can cause any changes to take effect. The console can communicate the parameters to the network analysis platform, which can utilize the new parameters as part of training a new ML model and in detecting problems in the grid 402. The network analysis platform can perform the analysis separately on multiple grids that exist within the MGRS matrix.

Figure 5:
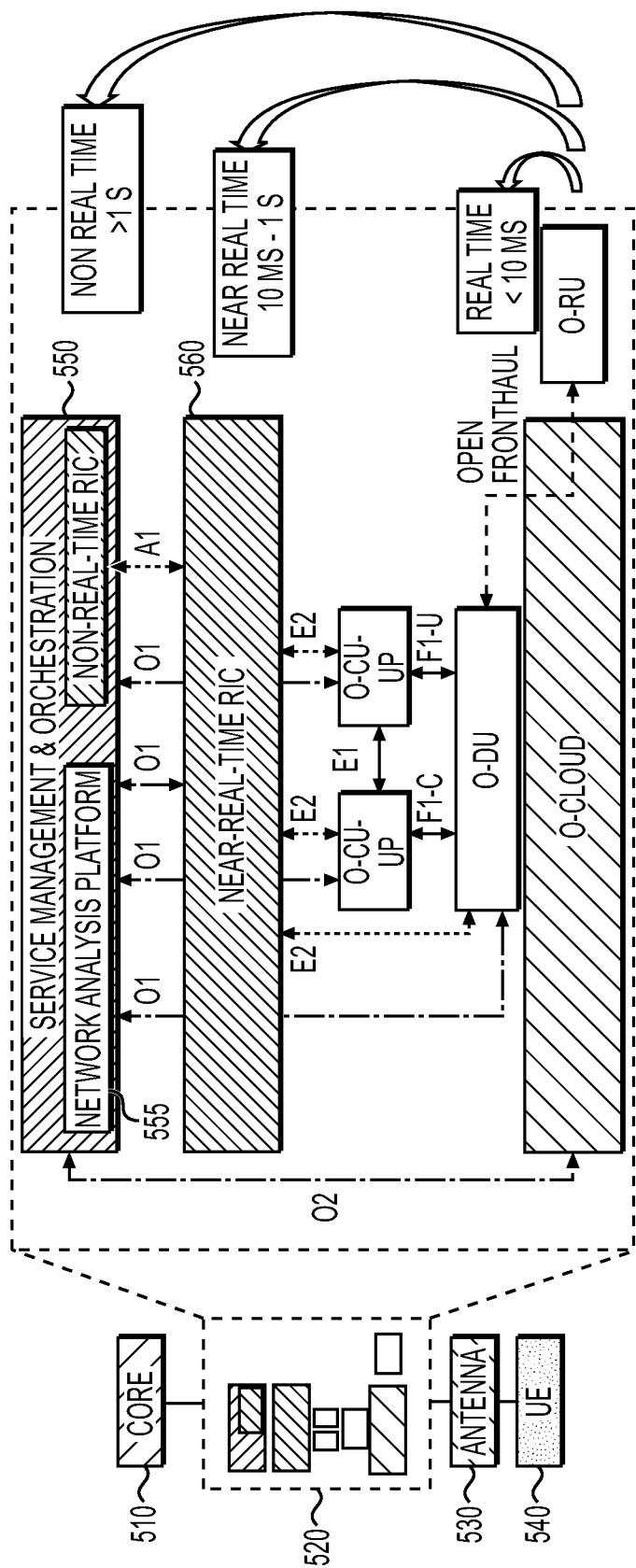
FIG. 5 is an illustration of an example system for grid-based anomaly area identification and solution nomination in a radio access network.

FIG. 5 is an illustration of example system components for performing the stages described above. In one example, the network analysis platform 555 can execute within a service management and orchestration ("SMO") layer 550 of an open radio access network ("ORAN") architecture 520. The SMO layer 550 and network analysis platform 555 can execute on one or more physical hardware servers. The network analysis platform 555 can act as a controller of various services. The network analysis platform 555 can interact with the near-real-time RAN intelligent controller ("RIC") 560 to make changes to nominated cells over the cloud, in an example. The O1 and A1 interfaces can assist passing the information explained above. These interfaces can also help with conflict resolution.

In one example, real-time data processing is not required for operation of the network analysis platform 555. The network analysis platform 555 can give hourly views of the network at, for example, a 1 km MGRS scale.

The ORAN architecture 520 can operate on multiple servers and can interface with a core network 510. The core network 510 can provide access controls to ensure users are authenticated for services and can route communications over a telco network.

The ORAN architecture 520 can act as a link between the core network 510 and user devices 540, such as phones and IoT devices. The KPI samples and user data can come from the cells or from a cell trace record ("CTR") or drive test. Location information (latitude, longitude) can be included. Cell data can come from performance management ("PM") counters.

A cell can be integrated with the ORAN architecture 520 for purposes of connecting to the core network 510. The cell can transmit and receive signals using an antenna 530. The antenna 530 can be tilted or powered as described above to ensure quality connections with user devices 540. The architecture described above can assist with identifying and solving coverage and throughput problems in a RAN network.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for two-level grid-based anomaly area identification and solution nomination in a radio access network, comprising:
   mapping key performance indicator ("KPI") samples from user sessions to individual bins of a grid, wherein the grid applies to a geographic region on a first level, the bins indicate areas within a second level of the geographic region, and the KPI samples are associated with a time period;
   providing values based on the mapped KPI samples as inputs to a machine learning model, wherein the machine learning model outputs an indication that a problem with coverage or throughput exists for the grid;
   identifying bins within the grid based on ranking the bins for low performance according to the mapped KPI samples;
   for each identified bin, determining contributing serving cells based on at least one of:
     a percentage of mapped KPI samples attributable to each serving cell, and
     a percentage of mapped KPI samples indicating the low performance;
   nominating serving cells based on ranking the contributing serving cells across the grid; and
   applying a remedial action to a nominated serving cell.

2. The method of claim 1, wherein the grid is a matrix from a military grid reference system ("MGRS").

3. The method of claim 1, wherein a graphical user interface ("GUI") provides at least two of:
   a first option to adjust the time period for the KPI samples;
   a second option to adjust a size granularity of bins and the grid; and
   a third option for configuring a bottom percentile of mapped KPI samples to analyze when ranking the bins.

4. The method of claim 1, wherein remedial actions are applied to multiple of the nominated serving cells for fixing the problem with the grid.

5. The method of claim 1, wherein the remedial action improves coverage by changing a tilt or power parameter of the nominated serving cell or a neighbor cell to the nominated serving cell.

6. The method of claim 1, wherein the remedial action improves signal interference to noise ratio ("SINR") by changing a tilt or power parameter of the nominated cell or a neighbor cell to the nominated cell.

7. The method of claim 1, wherein the remedial action adjusts tilt or transmission power parameters to balance a load among the nominated serving cell and a neighbor cell, improving throughput of the nominated serving cell.

8. The method of claim 1, wherein the remedial action balances a load between the nominated serving cell and at least one of an inter-frequency neighbor cell and an intra-frequency neighbor cell, improving throughput of the nominated serving cell.

9. A non-transitory, computer-readable medium containing instructions that, when executed by a hardware-based processor, perform stages for two-level grid-based anomaly area identification and solution nomination in a radio access network, the stages comprising:
    mapping key performance indicator ("KPI") samples from user sessions to individual bins of a grid, wherein the grid applies to a geographic region on a first level, the bins indicate areas within a second level of the geographic region, and the KPI samples are associated with a time period;
    providing values based on the mapped KPI samples as inputs to a machine learning model, wherein the machine learning model outputs an indication that a problem with coverage or throughput exists for the grid;
    identifying bins within the grid based on ranking the bins for low performance according to the mapped KPI samples;
    for each identified bin, determining contributing serving cells based on at least one of:
        a percentage of mapped KPI samples attributable to each serving cell, and
        a percentage of mapped KPI samples indicating the low performance;
    nominating serving cells based on ranking the contributing serving cells across the grid; and
    applying a remedial action to a nominated serving cell.

10. The non-transitory, computer-readable medium of claim 9, wherein the grid is a matrix from a military grid reference system ("MGRS").

11. The non-transitory, computer-readable medium of claim 9, wherein a graphical user interface ("GUI") provides at least two of:
    a first option to adjust the time period for the KPI samples;
    a second option to adjust a size granularity of bins and the grid; and
    a third option for configuring a bottom percentile of mapped KPI samples to analyze when ranking the bins.

12. The non-transitory, computer-readable medium of claim 9, wherein remedial actions are applied to multiple of the nominated serving cells for fixing the problem with the grid.

13. The non-transitory, computer-readable medium of claim 9, wherein the remedial action improves coverage by changing a tilt or power parameter of the nominated serving cell or a neighbor cell to the nominated serving cell.

14. The non-transitory, computer-readable medium of claim 9, wherein the remedial action improves signal interference to noise ratio ("SINK") by changing a tilt or power parameter of the nominated cell or a neighbor cell to the nominated cell.

15. The non-transitory, computer-readable medium of claim 9, wherein the remedial action adjusts tilt or transmission power parameters to balance a load among the nominated serving cell and a neighbor cell, improving throughput of the nominated serving cell.

16. The non-transitory, computer-readable medium of claim 9, wherein the remedial action balances a load between the nominated serving cell and at least one of an inter-frequency neighbor cell and an intra-frequency neighbor cell, improving throughput of the nominated serving cell.

17. A system for two-level grid-based anomaly area identification and solution nomination in a radio access network, comprising:
    a memory storage including a non-transitory, computer-readable medium comprising instructions; and
    a computing device including a hardware-based processor that executes the instructions to carry out stages comprising:
        mapping key performance indicator ("KPI") samples from user sessions to individual bins of a grid, wherein the grid applies to a geographic region on a first level, the bins indicate areas within a second level of the geographic region, and the KPI samples are associated with a time period;
        providing values based on the mapped KPI samples as inputs to a machine learning model, wherein the machine learning model outputs an indication that a problem with coverage or throughput exists for the grid;
        identifying bins within the grid based on ranking the bins for low performance according to the mapped KPI samples;
        for each identified bin, determining contributing serving cells based on at least one of:
            a percentage of mapped KPI samples attributable to each serving cell, and
            a percentage of mapped KPI samples indicating the low performance;
        nominating serving cells based on ranking the contributing serving cells across the grid; and
        applying a remedial action to a nominated serving cell.

18. The system of claim 17, wherein the grid is a matrix from a military grid reference system ("MGRS").

19. The system of claim 17, wherein a graphical user interface ("GUI") provides at least two of:
    a first option to adjust the time period for the KPI samples;
    a second option to adjust a size granularity of bins and the grid; and
    a third option for configuring a bottom percentile of mapped KPI samples to analyze when ranking the bins.

20. The system of claim 17, wherein the remedial action improves coverage by changing a tilt or power parameter of the nominated serving cell or a neighbor cell to the nominated serving cell.

* * * * *